United States Patent
Agrawal et al.

(10) Patent No.: US 10,583,748 B2
(45) Date of Patent: Mar. 10, 2020

(54) MAGNETIC SYSTEM FOR AN AUTOMOBILE FOR INCREASING FUEL EFFICIENCY

(71) Applicants: Sanskar Agrawal, Pennington, NJ (US); Sanskriti Agrawal, Pennington, NJ (US)

(72) Inventors: Sanskar Agrawal, Pennington, NJ (US); Sanskriti Agrawal, Pennington, NJ (US)

(*) Notice: Subject to any disclaimer, the term of this patent is extended or adjusted under 35 U.S.C. 154(b) by 335 days.

(21) Appl. No.: 15/369,317

(22) Filed: Dec. 5, 2016

(65) Prior Publication Data

US 2018/0154848 A1 Jun. 7, 2018

(51) Int. Cl.
| | |
|---|---|
| *B60R 16/023* | (2006.01) |
| *B60L 15/20* | (2006.01) |
| *B60R 11/04* | (2006.01) |
| *B60R 16/03* | (2006.01) |
| *B60G 17/0165* | (2006.01) |
| *B60L 13/10* | (2006.01) |
| *B60L 13/04* | (2006.01) |
| *B60R 11/00* | (2006.01) |

(52) U.S. Cl.
CPC .......... *B60L 15/20* (2013.01); *B60G 17/0165* (2013.01); *B60L 13/04* (2013.01); *B60L 13/10* (2013.01); *B60G 2202/16* (2013.01); *B60G 2400/821* (2013.01); *B60G 2401/142* (2013.01); *B60G 2500/20* (2013.01); *B60L 2270/145* (2013.01); *B60R 11/04* (2013.01); *B60R 2011/004* (2013.01); *Y02T 10/7258* (2013.01)

(58) Field of Classification Search
None
See application file for complete search history.

(56) References Cited

U.S. PATENT DOCUMENTS

| | | | | |
|---|---|---|---|---|
| 3,770,290 A | * | 11/1973 | Bottalico | B60G 13/14 188/164 |
| 4,639,014 A | * | 1/1987 | Tanaka | B60G 17/018 280/5.514 |
| 5,317,976 A | * | 6/1994 | Aruga | B60L 13/10 104/282 |
| 8,232,699 B2 | | 7/2012 | Letang | |
| 9,469,395 B1 | * | 10/2016 | Simha | B64C 23/005 |

(Continued)

OTHER PUBLICATIONS

Gysen et al. ("Electromagnetic Active Suspension System" published on www.youtube.com on Apr. 14, 2011, accessible at the following internet address: https://www.youtube.com/watch?v=IQ1eKddstxM (Year: 2011).*

(Continued)

*Primary Examiner* — Todd M Melton
*Assistant Examiner* — Jason R Roberson
(74) *Attorney, Agent, or Firm* — Standley Law Group LLP

(57) ABSTRACT

A magnetic system for an automobile having a body portion and a base portion with a first and second set of electromagnets placed on the base station and the body portion respectively and wherein the body portion is adapted to raise off the base portion when sufficient electricity is supplied to the first and second set of electromagnets. A plurality of slider mechanisms operationally attached to the automobile, each having a groove portion running in the vertical direction, allow the body portion to be raised off the base station.

19 Claims, 8 Drawing Sheets

(56) References Cited

U.S. PATENT DOCUMENTS

| | | | | |
|---|---|---|---|---|
| 9,597,978 | B1* | 3/2017 | Konchitsky | A63C 17/0046 |
| 2003/0105563 | A1* | 6/2003 | Oshima | B60L 15/2036 |
| | | | | 701/22 |
| 2005/0102083 | A1* | 5/2005 | Xu | B60R 21/0132 |
| | | | | 701/70 |
| 2009/0121444 | A1* | 5/2009 | Bushko | B60G 17/0157 |
| | | | | 280/5.507 |
| 2012/0112590 | A1* | 5/2012 | Letang | B60L 13/04 |
| | | | | 310/90.5 |
| 2012/0119463 | A1* | 5/2012 | Paulides | F16F 6/00 |
| | | | | 280/124.106 |
| 2012/0193179 | A1* | 8/2012 | Gysen | B60G 11/00 |
| | | | | 188/267 |
| 2013/0127175 | A1* | 5/2013 | Zuo | B60G 17/06 |
| | | | | 290/1 A |

OTHER PUBLICATIONS

Gysen et al. "Active Electromagnetic Suspension System for Improved Vehicle Dynamics" IEEE Transactions on Vehicular Technology, vol. 59, No. 3, Mar. 2010, pp. 1156-1163 (Year: 2010).*

* cited by examiner

MAGNETIC SYSTEM FOR AN AUTOMOBILE FOR INCREASING FUEL EFFICIENCY

BACKGROUND OF THE INVENTIVE FIELD

The present invention is directed to a magnetic system for raising or levitating the body portion of the car to increase fuel efficiency, increase speed and reduce reliance on suspension systems. This system will help reduce "range anxiety," depending on what variant the vehicle is made electric or ICE, as the system will increase the automobile's ability to run longer on a tank of gas or charge of electricity. The system uses magnetic energy to levitate the majority of weight in the vehicle reducing the total energy needed to propel the vehicle.

Use of levitation is currently implemented in high speed trains in Japan and Europe. However, when considering levitation in automobiles, the only concept of levitation discussed is the "train style" levitation that requires significant changes to existing roads. "Train style" levitation requires overhauling existing roads to a magnetic system similar to magnetic train tracks. Converting all existing roads into electromagnets is a very time consuming and expensive proposition.

The use of levitation has also been discussed in context of automobiles as part of a magnetic propulsion system. The focus of these prior systems is propulsion rather than levitation. Propulsion using magnetic fields when the wheel is in contact with the ground offers no additional benefit compared to the mechanism employed by an electric vehicle to move the wheels using power from a battery pack. Internal Combustion Engines (ICE) can achieve similar propulsion by converting fuel to electricity. Further, the propulsion mechanism adds a great deal of complexity that could make a car much more complex than a modern electric vehicle.

The present invention focuses on a magnetic system for levitation of a body portion of the car as opposed to using magnets directly for propulsion. The purpose of levitation in the automobile of the present invention is to transfer a substantial portion of the weight of the vehicle, except the wheels and associated mechanism needed for physical movement, to the upper part of the vehicle to substantially reduce or entirely counterbalance the weight of the upper part of vehicle through magnetic repulsion. By reducing the weight of the vehicle, the only part of the vehicle imparting its weight on the road is a base station which remains in contact with the road.

SUMMARY OF THE GENERAL INVENTIVE CONCEPT

The present invention contemplates the concept of magnetic levitation as a mechanism to increase fuel efficiency and speed of the vehicle. Levitation is achieved by separating the car into two parts: the base station which comprises of the vehicle's moving parts including axle, transmission and wheels. The rest of the vehicle is contained in the car body that is levitated from the base station using the magnetic system of the present invention.

In one embodiment of the invention, the invention is comprised of a magnetic system for an automobile for increasing fuel efficiency (defined as gas or electricity), comprising: a base station; a first set of front wheels operationally connected to the base station; a first set of back wheels operationally connected to the base station; a body portion housing passenger seats, brake pedal, accelerator pedal, and steering wheel; a first set of electromagnetics placed on the base station; a second set of electromagnets placed around the body portion; a plurality of slider mechanisms operationally attached to the automobile, each having a groove portion running in the vertical direction; a plurality of rods, each of the plurality of rods adapted to fit into one of the groove portions of one of the slider mechanisms for allowing the body portion to be raised off the base station; a battery for supplying electricity to the first and second set of electromagnets; a calibration system for leveling the position of the body portion; wherein the calibration system is comprised of a plurality of photo diodes and a photodetector placed on opposite sides each of the groove portions for calibrating the horizontal position of the body portion; a plurality of cameras placed at the front of the automobile; a control system in communication with the plurality of cameras; the control system programmed with instructions for executing on the control system to: 1) receive signals from the plurality of cameras; 2) control the amount of electricity supplied to the first and second set of electromagnets for stabilizing the body portion during operation of the automobile; wherein the base station is comprised of an upper portion and a bottom portion and wherein suspension coils are operationally placed between the upper and bottom portions of the base station; wherein the body portion raises up off the body portion when sufficient electricity is supplied to the first and second set of electromagnets.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

Figure 1:
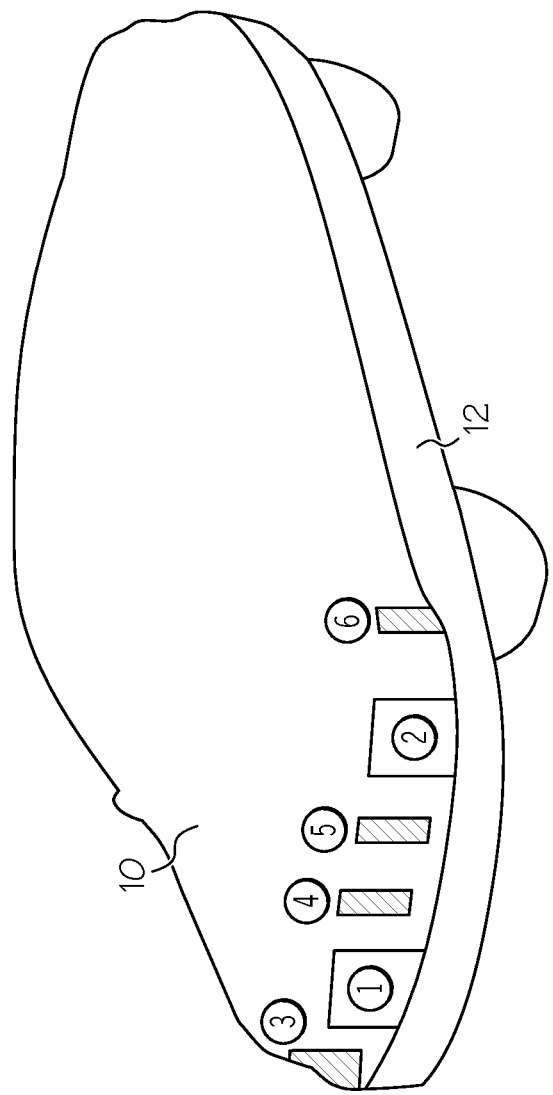
FIG. 1 illustrates one embodiment of the present invention illustrating the placement of various magnets on an automobile.

FIG. 1 illustrates one embodiment of the present invention illustrating the placement of various magnets on an automobile. The car into two parts: a car body 10 and a base station 12. The car has a front end and a back end. Electromagnets 1, 2 are affixed to the base station while electromagnets 2, 3, 4, 5, 6 are affixed to the body portion at one end of the car. In another embodiment, this magnetic arrangement is also reproduced on the other end of the car. In yet another embodiment, this magnetic arrangement can be placed around all four wheels of the car.

The automobile of the present invention is configured in a modular fashion. This requires a decoupling of all moving parts connected for forward movement of car (axles, transmission, wheels in the case of ICE vehicles) into a base station from the body of the car (the rest of the car separate from the parts for propelling the car—namely the compartment that carries passengers and luggage). As discussed in more detail below, the base station and the body portion of the automobile of the present invention are connected using a novel groove and slider mechanism.

The body portion of the automobile of the present invention is adapted to raise off, or levitate off, of the base station. In the preferred embodiment, no mechanical devices connect the two except needed electrical wires and a slider mechanism that keeps the car body movably attached to base station.

Figure 2A:
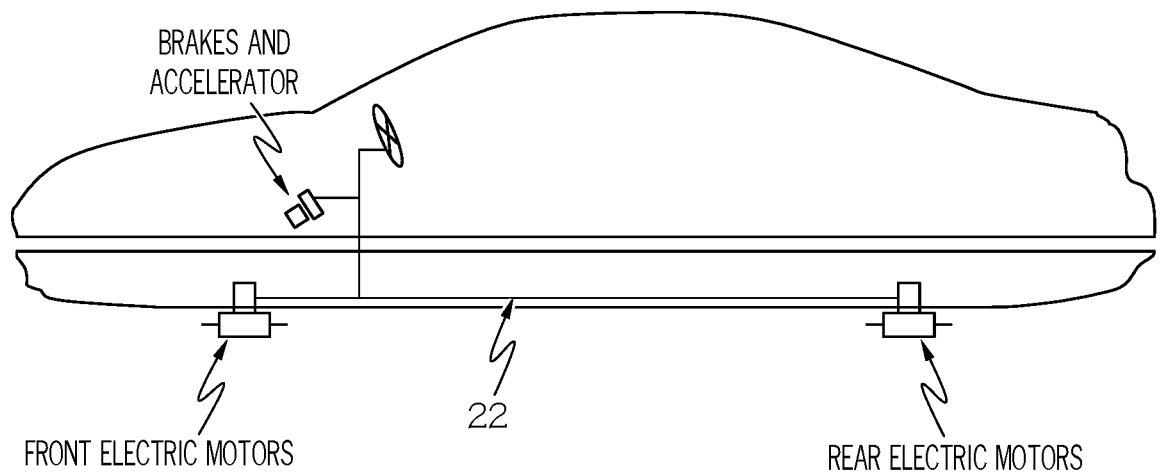
FIG. 2A illustrates one embodiment of the navigation bus of the present invention.

In one embodiment, the steering of the vehicle is electronic. FIG. 2A illustrates one embodiment of the navigation bus 22 of the present invention. As the steering wheel turns, the angle of the steering wheel will be transmitted to the electric motors that will rotate the wheels in the base station through a cable. Similarly, an accelerator and brakes will transmit the degree to which these controls have been pressed. These signals are transmitted electronically to the electric motors that will rotate wheels at speeds commensurate with the extent to which either of these controls (accelerator and brake) have been pressed.

Figure 2B:
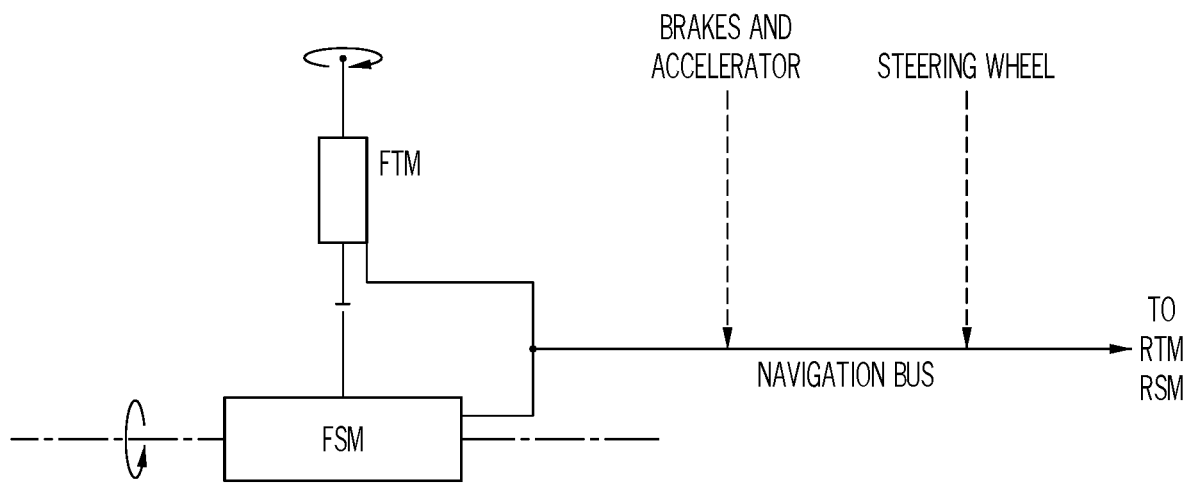
FIG. 2B illustrates one embodiment of the configuration of the front tilt motors (FTM) and rear tilt motors (RTM) of the present invention.

FIG. 2B illustrates one embodiment of the configuration of the front tilt motors (FTM) and rear tilt motors (RTM) of the present invention. The purpose of tilt motors is to move the wheels right, left or anywhere in between. This configuration allows the car to change direction. Using rear tilt motors decreases the turning radius significantly versus having only the front tilt motors.

FSM and RSM are front and rear speed motors respectively. The purpose of speed motors is to accelerate or decelerate the car, i.e. control the speed of the wheels in the car. In one embodiment, the car has only one set of motors (for tilt and speed) however, it is appreciated that the car can be configured with front and rear motors (for tilt and speed).

FTM and RSM are default choices, however the RTM and FSM can be added to assist in turning radius and increasing stability in the winter.

Figure 3A:
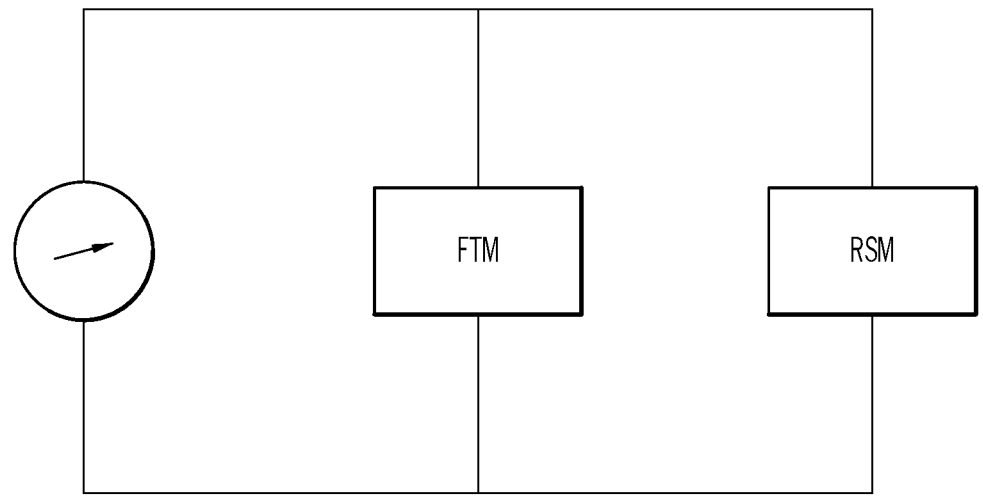
FIG. 3A shows an example schematic of how speed, accelerator, and brake signals are fed to both front and rear speed motors.
Figure 3B:
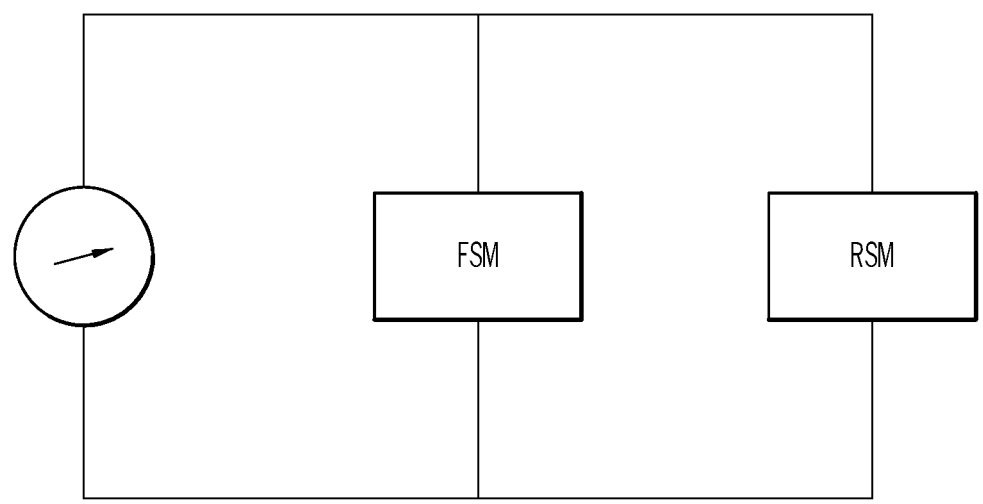
FIG. 3B shows an example schematic of how speed, accelerator, and brake signals are fed to both front and rear speed motors.

In current vehicles, the angle of steering is physically connected to the steering wheel assembly. Steering motors exist in electric vehicles but not in ICE vehicles as they run on a central engine. However, given the fundamental shift in design of the present invention, whereby the car body is essentially decoupled from base station (no physical connection, other than the slider mechanism), the car body transmits information, such as speed, angle of steering etc., via electrical wires to the motors. FIG. 3A shows an example schematic of how steering angle is fed to both front and rear tilt motors (in parallel), i.e. both motors have the same information about the parameter. FIG. 3B shows an example schematic of how speed, accelerator, and brake signals are fed to both front and rear speed motors.

Figure 4:
FIG. 4 illustrates the magnetic forces produced by the magnets on the base station and the body portion.

The levitation mechanism of the present invention works by deploying electromagnets. In one embodiment, electromagnets are placed strategically on the base station near all four wheels. In addition, a plurality of sets of electromagnets are placed on the car body on both sides of each of the base electromagnets. Thus levitation is achieved by interaction of magnetic fields produced by electromagnets on the base station with the magnets around it that are affixed to the body portion. FIG. 4 illustrates the magnetic forces produced by the magnets on the base station and the body portion.

When electricity is supplied to the electromagnets on the base station and car body, the repelling magnetic forces of the magnets cause enough repulsive force to lift the car body portion 1-3 inches above the base station. In one embodiment of the invention, electricity is supplied to the electromagnets using rechargeable Lithium-Ion battery packs. Alternatively, an electric generator that converts gasoline into electricity can be installed into the car to supply electricity to the electromagnets.

In one embodiment, a current of 1.5 Amps flowing through each of the electromagnets shown in FIG. 1, each formed with 2000 turns of coil, area of 0.5 m squared each (5 square feet) and separated from an electromagnet above by 0.025 m (1 inches), would be enough to support the weight of a vehicle weighing up to 5000 lbs. In one embodiment there are four electromagnets on the base station and at least the same number on the car body. The current flowing through the electromagnet can be reduced by adjusting other parameters such as the number of coils, area of coil, etc.

The power requirement for the electromagnets can be reduced by using superconductivity principles. The use of superconductivity will require the use of refrigerators that would keep the temperature of the coils below its superconductivity transition temperature. Superconductors would reduce the resistance in coils to near zero and thus energy required to power the electromagnets would be reduced substantially according to formula $P=I^2 \times R$ where P=power used, I=current flowing through coils, R=resistance of the electromagnet.

Levitation acts an anti-gravity force and reduces the weight of car body on the base station and ultimately the road. This reduces friction and total weight of the vehicle which reduces the energy needed to propel the car forward. The ultimate result is an increase in speed of vehicle and fuel efficiency.

Figure 5A:
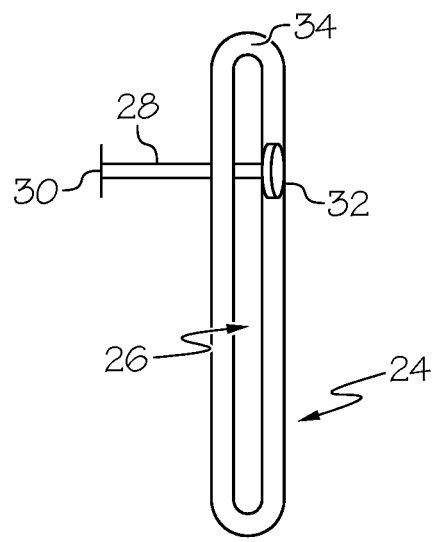
FIG. 5A illustrates one embodiment of the slider mechanism of the present invention.

When the body portion is raised or levitated from the base station, the body portion is connected to the base station without restricting its vertical degree of motion. A slider mechanism allows the the upper base station and car body to be attached without restricting its degrees of levitation. FIG. 5A illustrates one embodiment of the slider mechanism 24 of the present invention. A plurality of these slider mechanisms are placed around the car to keep the base station and body portion in mechanical attachment with each other. The purpose of the slider is to attach the car body with the upper part of the base station and restrict horizontal degrees of freedom while allowing vertical degree of motion (i.e., levitation). The vertical groove 26 in the slider mechanism achieves this goal without a complex mechanism to check the location of the upper electromagnets in car body versus the lower electromagnets in the base station.

The slider is a rod 28 for placement within the groove where one end of the rod 30 connects to the car body. The other end of the rod is comprised of a retainer portion 32 having a width that is wider than the groove opening. This retainer portion retains the rod in place so that the rod portion does not disengage from the groove opening. The rod portions of the slider mechanisms move vertically within the groove opening to allow the body portion to levitate off the base portion yet maintaining the body portion and base station mechanically attached to each other.

Figure 5B:
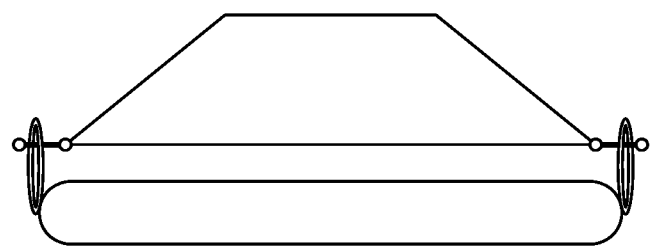
FIG. 5B illustrates one embodiment of the slider mechanism and its connection to the body portion and base station.

FIG. 5B illustrates one embodiment of the slider mechanism and its connection to the body portion and base station. In the embodiment of FIG. 5B, the groove opening is formed from an oval ring 34. In this embodiment, a bottom portion of the oval ring is attached to the base station. As the car body levitates above the base station, the slider rod is allowed to rise up through the groove. Similarly, when the car body comes back down (as current to electromagnets is turned off or down), the slider allows the car body to come back down. A number of these slider mechanisms are placed around the car, the number depending on the weight and size of the automobile. In one embodiment, the slider mechanisms are made of durable metal welded to the body and base station, respectively.

Figure 5C:
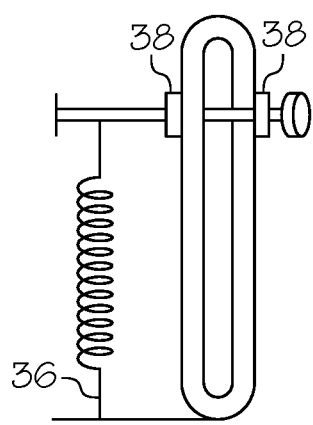
FIG. 5C illustrates a close-up view of one embodiment of the slider mechanism of the present invention.

FIG. 5C illustrates a close-up view of one embodiment of the slider mechanism of the present invention. To ensure that movement of the slider rod is smooth as car body rises, springs 36 can be connected between the slider and base of the groove. Rubber cushions 38 can also be attached on each side of groove to act as a buffer for the rod. These components would reduce any sudden movements of the slider rod.

Multiple slider mechanisms can be used to attach the car body to the base station to achieve a stable configuration. The location of electromagnets is preferably calibrated at the time of manufacture. The amount of current supplied to each of the electromagnets to achieve a horizontal positioning of the car body upon levitation is also calibrated once during manufacture of the car but can be recalibrated later as needed. This calibration may be needed since there may be very slight differences in electromagnetic fields generated for same amount of current supplied to electromagnets. The imbalance in the plane of the car body may occur with rear of car rising up relative to front or one side of car lower than the other.

Figure 6:
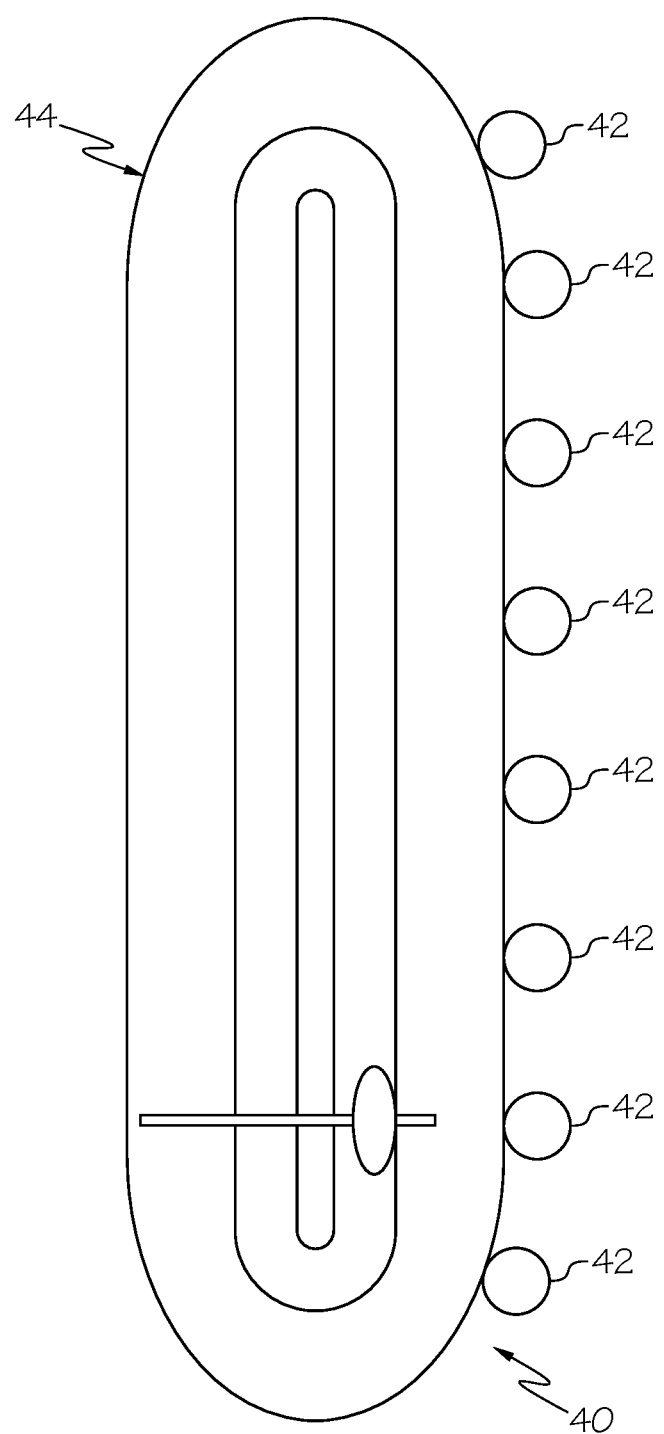
FIG. 6 illustrates one embodiment of the calibration device of the present invention.

A calibration mechanism 40, to calibrate the horizontal position of the car body, may also be used with the magnetic system of the present invention. FIG. 6 illustrates one embodiment of the calibration device of the present invention. In this embodiment, each of the slider mechanisms would transmit an electrical signal using photo diodes 42 that would transmit information relating to the position of car body for each slider. The photodiodes transmit signals that are detected by a photodetector 44 placed on the other side of the slider mechanism. The calibration detects the location of the rod and transmits this information to the control system. This calibration system compensates for any major discrepancies in position of each slider during levitation. This information can also be transmitted to the car dashboard for display. The car body can be made level again by increasing or reducing current to the appropriate electromagnet attached to base station so that all of the slider rods are in line (elevation the same). In other words, the processing system is programmed with controls to receive the information from the calibration devices to generate control signals for controlling each of the current levels supplied to each electromagnet. This process can be automated as part of a calibration procedure when the car starts.

Figure 7A:
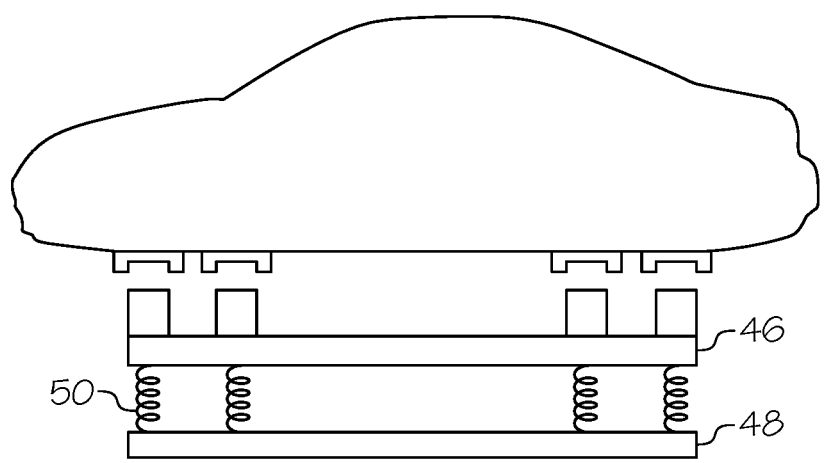
FIG. 7A illustrates one embodiment of the suspension system of the present invention.

The present system can be configured with a suspension system for reducing vibrations felt by car passengers. Vibration can be alleviated by separating the base station into a two-layer system and by adding a suspension mechanism between the two layers. FIG. 7A illustrates one embodiment of the suspension system of the present invention.

The suspension system separates the base station into two parts: upper and lower base station 46, 48. The upper base station is connected with lower base station using suspension coils 50. This system avoids any complex rebalancing of the vehicle's weight using electromagnetic fields as proposed in other traditional systems. This reduces the complexity of the design required. Potholes in the road can cause a perturbation in the lower base station but the shock is absorbed using these suspensions so that the rest of the car mechanism (upper base station and car body) are protected from these perturbations.

Figure 7B:
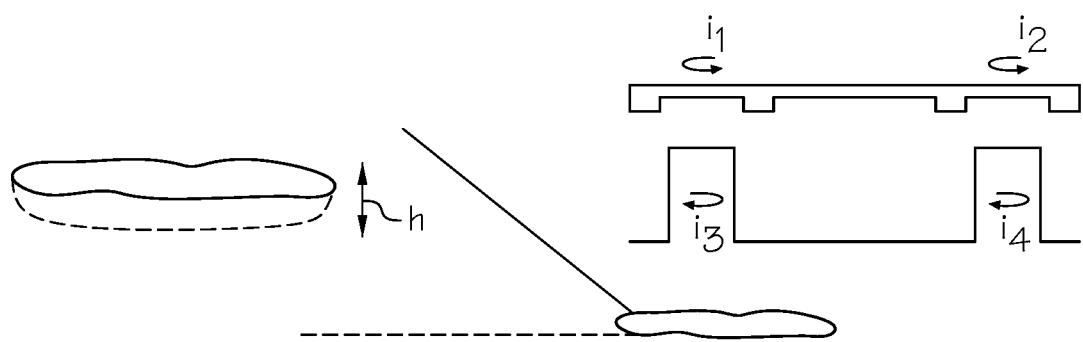
FIG. 7B illustrates an example illustration of the functioning of the suspension system of the present invention.

FIG. 7B illustrates an example illustration of the functioning of the suspension system of the present invention. In this example, a pothole is experienced by the vehicle on one side. Currents to the front electromagnets on the side experiencing the pothole are increased so that the distance between two electromagnets increases by h to compensate for the pothole.

Currents on the same side of the vehicle in the rear are increased as well except for a delay taking into consideration that the pothole will cross the rear side of the vehicle after a period of time ($\Delta t = Lc/Vc$), where Lc is the length between the front and rear wheel and Vc is the speed of the car.

Figure 8:
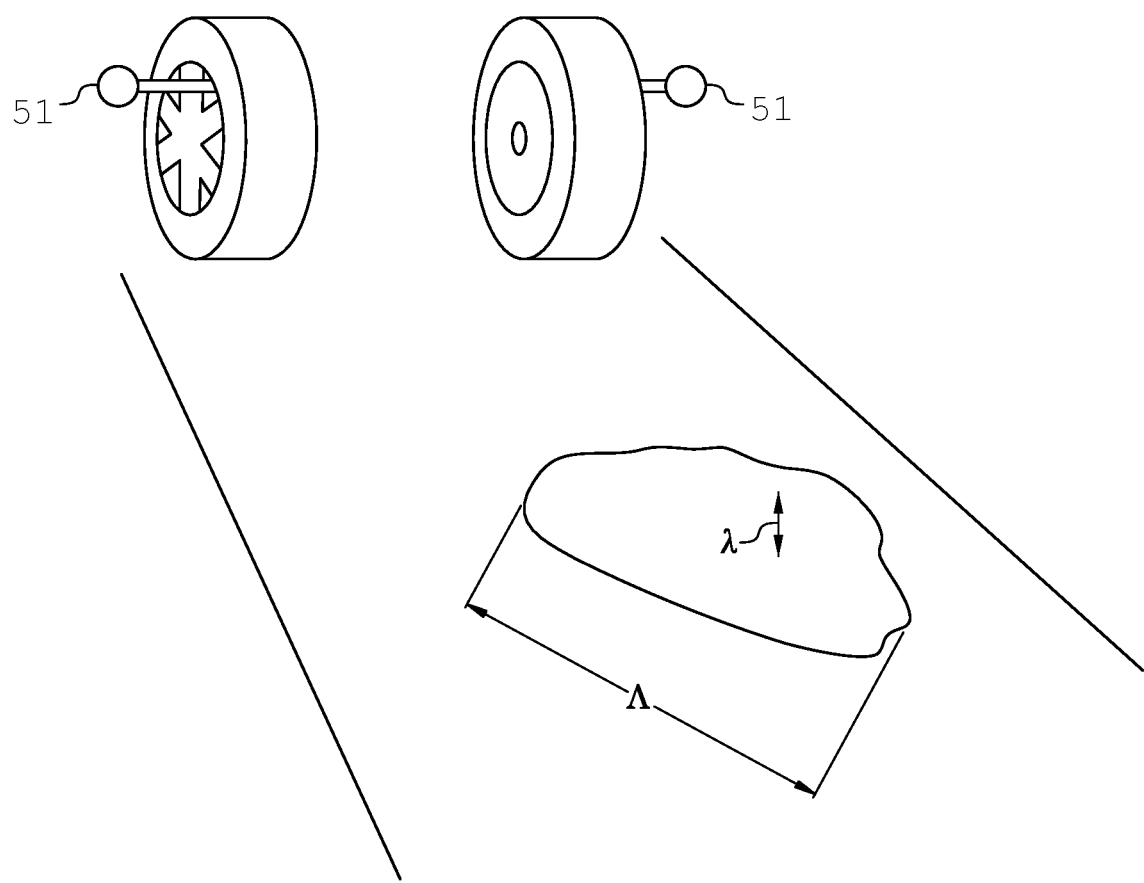
FIG. 8 illustrates a camera-based suspension system of the present invention.

As cars start moving away from physical suspensions, an electronic approach is also feasible. For example, a camera based approach to suspension can be substituted for, or augmented with, a physical suspension which is far simpler than other proposed mechanisms. FIG. 8 illustrates a camera-based suspension system of the present invention. The cameras 51 are attached at each of the front wheels and have a 360-degree view of the road (front and behind). The cameras monitor the road conditions assessing the dimensions of indentations in the road such as potholes. The control system in communication with the cameras will analyze this data and will control the current in the magnetic coils to increase or decrease the levitation to cope with the bump or pothole detected to ensure a smooth ride. In the preferred embodiment, a time delay is introduced into the control signals that is commensurate with distance between car and pothole.

When the camera sees a pothole about to hit the front right wheel, current in the corresponding electromagnets ($i_1$ and $i_3$) are increased so that the distance between the two electromagnets increases by depth of pothole. Levitation in the rear left electromagnets can be adjusted using the same camera data with a slight delay, e.g., the time it takes rear wheels to travel to the same road feature (in this case the pothole) relative to the front wheels given by formula $\Delta t = Lc/Vc$.

In an alternative embodiment, additional independent cameras can be applied to rear wheels as well to ensure more accuracy. Once this electronic suspension mechanism is calibrated, a physical suspension system may not be needed further reducing need for another physical device in the vehicle. In this embodiment, the base station will be configured as a unibody base station rather than two-tiered system previously discussed.

The use of levitation in vehicles is a needed first step in moving to more efficient vehicles with reduced need for physical devices within the vehicle. The technology will work with both ICE and electric vehicles.

While certain embodiments of the present invention are described in detail above, the scope of the invention is not to be considered limited by such disclosure, and modifications are possible without departing from the spirit of the invention as evidenced by the following claims:

What is claimed is:

1. A magnetic system for an automobile for increasing fuel efficiency, comprising:
   a base station comprising:
     a platform having an upper surface;
     a set of front wheels connected to the platform;
     a set of back wheels connected to the platform;
     a first set of electromagnets placed at various locations along the upper surface;
   a body portion housing passenger seats, a brake pedal, an accelerator pedal, and a steering wheel;
   a second set of electromagnets placed along a lower surface of the body portion at various locations substantially opposite each of the first set of electromagnets, wherein the first and second set of electromagnets are configured to levitate the body portion above the base station when sufficient electricity is supplied to each of the first and second set of electromagnets, wherein such levitation is sufficient to create a continuous gap between the bottom surface of the body portion and the upper surface of the platform of the base station;
   a plurality of slider mechanisms attached to the base station, each having a groove portion extending in the vertical direction; and
   a plurality of rods attached to the body portion, wherein each of the plurality of rods is adapted to fit into one of the groove portions of one of the slider mechanisms such that vertical levitation of the body portion is limited relative to the base station.

2. The magnetic system according to claim 1, further comprising:
   a plurality of front tilt motors mounted to the platform and operationally connected to the first set of front wheels.

3. The magnetic system according to claim 1, further comprising:
   a plurality of front speed motors mounted to the platform and operationally connected to the first set of front wheels.

4. The magnetic system according to claim 3, further comprising:
   an electrical wire connecting the plurality of front speed motors to the accelerator pedal.

5. The magnetic system according to claim 2, further comprising:
   an electrical wire connecting the plurality of front tilt motors to the steering wheel.

6. The magnetic system according to claim 1, wherein the base station is comprised of an upper portion and a bottom portion and wherein suspension coils extend between the upper and bottom portions of the base station.

7. The magnetic system according to claim 1, further comprising:
   a calibration system configured to maintain the body portion in a substantially level orientation.

8. The magnetic system according to claim 7, wherein the calibration system is comprised of a plurality of photo diodes spaced apart vertically along at least one of the grooves and a photodetector placed on an opposite side of each of the grooves for calibrating the vertical position of the body portion.

9. The magnetic system according to claim 1, further comprising:
   a plurality of cameras placed at the front of the automobile for detecting approaching obstacles in the path of the automobile; and
   a control system in communication with the plurality of cameras,
   wherein the control system is programmed with instructions for executing on the control system to: 1) receive signals from the plurality of cameras indicating the presence of one or more approaching obstacles; 2) control the amount of electricity supplied to the first and second set of electromagnets for stabilizing the body portion to preemptively compensate for expected ride changes when the automobile contacts the approaching obstacle.

10. A magnetic system for an automobile for increasing fuel efficiency, comprising:
    a power source;
    a base station comprising:
      a platform having an upper portion;
      a set of front wheels connected to the platform;
      a set of back wheels connected to the platform;
      a first set of electromagnets placed at various locations along the upper portion, wherein each of said first set of electromagnets is electrically connected to the power source;
      a plurality of front tilt motors mounted to the platform and operationally connected to the first set of front wheels; and
      a plurality of front speed motors mounted to the platform and operationally connected to the first set of front wheels;
    a body portion housing passenger seats, a brake pedal, an accelerator pedal, and a steering wheel;
    a second set of electromagnets placed at various locations along a lower portion of the body portion, wherein each of the second set of electromagnets are positioned opposite one of the first set of electromagnetics, wherein each of said second set of electromagnets is electrically connected to the power source, wherein the body portion is configured to be vertically levitated above the base station when sufficient electricity is supplied from the power source to each of the first and second set of electromagnets to create a continuous gap between the lower portion of the body portion and the upper portion of the base station;
    a plurality of slider mechanisms attached to the base station, each having a groove portion extending vertically;
    a plurality of rods attached to the body portion, wherein each of the plurality of rods is adapted to fit into one of the groove portions of one of the slider mechanisms such that vertical levitation of the body portion is limited relative to the base station; and a calibration system for leveling the position of the body portion comprising a plurality of photo diodes spaced apart vertically along at least one of the grooves and a photodetector placed on an opposite side of the groove for calibrating the vertical position of the body portion.

11. The magnetic system according to claim 10, further comprising:
an electrical wire connecting the plurality of front speed motors to the accelerator pedal.

12. The magnetic system according to claim 10, further comprising:
an electrical wire connecting the plurality of front tilt motors to the steering wheel.

13. The magnetic system according to claim 10, further comprising a plurality of springs each attached at a first end to one of the rods and attached at a second end to the base station.

14. The magnetic system according to claim 10, further comprising:
a plurality of cameras placed at the front of the automobile for detecting approaching obstacles in the path of the automobile; and
a control system in communication with the plurality of cameras, wherein the control system programmed with instructions for executing on the control system to: 1) receive signals from the plurality of cameras indicating the presence of one or more approaching obstacles; 2) control the amount of electricity supplied to the first and second set of electromagnets for stabilizing the body portion to preemptively compensate for expected ride changes when the automobile contacts the approaching obstacle.

15. A magnetic system for an automobile for increasing fuel efficiency, comprising:
a power source;
a base station comprising:
a platform;
a set of front wheels connected to the platform;
a set of back wheels connected to the platform;
a first set of electromagnets placed at various locations along an upper portion of the platform, wherein each of said first set of electromagnets is electrically connected to the power source;
a front axle mounted to the platform and extending between the set of front wheels;
a rear axle mounted to the platform and extending between the set of rear wheels;
one or more motors operationally connected to the front axle or the rear axle; and
a transmission operationally connected to the one or more motors;
a body portion substantially encapsulating passenger seats, a brake pedal, an accelerator pedal, and a steering wheel;
a second set of electromagnets placed at various locations along a lower portion of the body portion, wherein each of the second set of electromagnets are positioned opposite one of the first set of electromagnets, wherein each of said second set of electromagnets is electrically connected to the power source such that the body portion is configured to be vertically levitated above the base station when sufficient electricity is supplied from the power source to each of the first and second set of electromagnets such that a continuous gap is created between the lower portion of the body portion and the upper portion of the base station;
a plurality of slider mechanisms attached to the base station, each having a groove extending vertically;
a plurality of rods attached to the body portion, wherein each of the plurality of rods is adapted to fit into one of the groove portions of one of the slider mechanisms such that vertical levitation of the body portion is limited relative to the base station;
a calibration system for leveling the position of the body portion comprising a plurality of photo diodes spaced apart vertically along at least one of the grooves and a photodetector placed on an opposite side of the groove for calibrating the vertical position of the body portion;
a plurality of cameras placed at the front and back of the automobile for detecting obstacles in the path of the automobile; and
a control system in communication with the plurality of cameras;
wherein the control system is programmed with instructions for executing on the control system to: 1) receive signals from the plurality of cameras indicating the presence of one or more obstacles in the intended path of the automobile; 2) to control the amount of electricity supplied to the first and second set of electromagnets for stabilizing the body portion to preemptively compensate for expected ride changes when the automobile contacts the approaching obstacle;
wherein the base station is comprised of an upper portion and a bottom portion and wherein suspension coils are operationally placed between the upper and bottom portions of the base station;
wherein the upper portion of the platform and the lower portion of the body portion comprise substantially flat surfaces which are substantially coextensive in size and oppose one another.

16. The magnetic system of claim 15 wherein:
the power source comprises one or more batteries.

17. The magnetic system of claim 15 wherein:
the power source is configured to selectively supply sufficient power to the first and second set of electromagnets such that the gap is 1 to 3 inches in size.

18. The magnetic system of claim 15 wherein:
the power source comprises a generator.

19. The magnetic system of claim 1 wherein:
the upper portion of the platform and the lower portion of the body portion comprise substantially flat surfaces which are substantially coextensive in size and oppose one another.

* * * * *